United States Patent
Chiche et al.

(10) Patent No.: US 8,617,501 B2
(45) Date of Patent: Dec. 31, 2013

(54) PROCESS FOR REMOVING SULPHUR-CONTAINING, NITROGEN-CONTAINING AND HALOGEN-CONTAINING IMPURITIES CONTAINED IN A SYNTHESIS GAS

(75) Inventors: David Chiche, Lyons (FR); Nicolas Boudet, Chaponost (FR); Jean Christophe Viguie, Lyons (FR); Marc Antoine Lelias, Ales (FR); Olivier Ducreux, Louveciennes (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 178 days.

(21) Appl. No.: 13/144,138

(22) PCT Filed: Dec. 3, 2009

(86) PCT No.: PCT/FR2009/001375
§ 371 (c)(1),
(2), (4) Date: Sep. 26, 2011

(87) PCT Pub. No.: WO2010/079265
PCT Pub. Date: Jul. 15, 2010

(65) Prior Publication Data
US 2012/0010306 A1  Jan. 12, 2012

(30) Foreign Application Priority Data

Jan. 12, 2009  (FR) .................... 09 00108

(51) Int. Cl.
*C01C 3/00* (2006.01)
*C07C 27/00* (2006.01)

(52) U.S. Cl.
USPC ........................... 423/237; 423/236; 518/700

(58) Field of Classification Search
USPC .................................. 423/236, 237; 518/700
See application file for complete search history.

(56) References Cited

U.S. PATENT DOCUMENTS

| | | | |
|---|---|---|---|
| 4,511,668 A | 4/1985 | Nozue et al. | |
| 5,660,807 A | 8/1997 | Forg et al. | |
| 6,107,353 A | 8/2000 | Koveal et al. | |
| 2004/0247507 A1 | 12/2004 | Nedez et al. | |
| 2006/0272502 A1 | 12/2006 | Van Grinsven et al. | |
| 2008/0242749 A1 | 10/2008 | Van Hardeveld et al. | |

FOREIGN PATENT DOCUMENTS

| | | |
|---|---|---|
| FR | 2 830 466 A1 | 4/2003 |
| WO | WO 2006/008317 A1 | 1/2006 |

OTHER PUBLICATIONS

International Search Report of PCT/FR2009/001375 (Apr. 14, 2010).

*Primary Examiner* — Jafar Parsa
(74) *Attorney, Agent, or Firm* — Millen, White, Zelano & Branigan, P.C.

(57) ABSTRACT

The invention relates to a process for finally removing sulphur-containing, nitrogen-containing and halogen-containing impurities contained in a synthesis gas, said process including:
  a) a joint step for hydrolysing COS and HCN contained in the gas and for collecting the halogen-containing compounds, using a $TiO_2$-based catalyst,
  b) a washing step using a solvent,
  c) a step for desulphurization on a collecting or adsorbing mass.

The synthesis gas purified in accordance with the process of the invention contains less than 10 ppb by weight, less than 10 ppb by weight of nitrogen-containing impurities and less than 10 ppb by weight of halogen-containing impurities.

17 Claims, No Drawings

PROCESS FOR REMOVING SULPHUR-CONTAINING, NITROGEN-CONTAINING AND HALOGEN-CONTAINING IMPURITIES CONTAINED IN A SYNTHESIS GAS

The present invention concerns the field of the purification of synthesis gases in general. It concerns more specifically a process allowing the removal of sulphur-containing and nitrogen-containing impurities, such as for example: $H_2S$, COS, $CS_2$, HCN and $NH_3$. Moreover, halogen-containing impurities such as HF, HCl, HBr and HI are also removed.

The invention relates to a process for removing sulphur-containing, nitrogen-containing and halogen-containing impurities contained in a synthesis gas, said process including:

a) a joint step for hydrolysing COS and HCN contained in the gas and for collecting the halogen-containing compounds, using a $TiO_2$-based catalyst,
b) a solvent washing step,
c) a step for desulphurisation on a collecting or adsorbing mass.

Advantageously, the process of the invention is utilised upstream of a Fischer-Tropsch unit, in such a way as to remove impurities which have an adverse effect on correct operation of said unit. The process can also be used in order to purify the synthesis gas utilised, for example, in cogeneration facilities, in chemical synthesis processes such as processes for synthesising methanol.

PRIOR ART

Synthesis gas is generally a gaseous mixture comprising carbon monoxide, hydrogen, water vapour and carbon dioxide. It further contains sulphur-containing, nitrogen-containing and halogen-containing impurities which are to be removed in order that the gas contains no more than residual contents thereof.

The impurities present in non-purified synthesis gas can bring about an accelerated corrosion of the installations in which the gases are utilised, such as for example gas turbines in integrated gasification combined cycles (IGCCs) and are capable of poisoning the catalysts used for chemical synthesis processes such as those used in Fischer-Tropsch or methanol synthesis, or else of reducing the performance levels of the materials used in fuel cells.

Environmental considerations also necessitate the removal of the impurities present in gases. In the particular case of Fischer-Tropsch synthesis, the specifications required at the input of the Fischer-Tropsch unit are particularly stringent, wherein the contents present in the synthesis gas generally have to be less than 10 ppb by weight for sulphur-containing impurities, less than 10 ppb by weight for nitrogen-containing impurities, and less than 10 ppb by weight for halogen-containing impurities.

The techniques usually employed for removing sulphur-containing impurities from a synthesis gas are of two types: desulphurisation by washing using a solvent and desulphurisation using a collecting mass, which is sulphurised.

The solvent washing technique can utilise amines such as monoethanolamine (MEA), diethanolamine (DEA) or methyldiethanolamine (MDEA) which are conventionally used for sweetening natural gas. In this case, the compounds to be removed ($H_2S$, $CO_2$) chemically react with the solvent.

During the use of MDEA, the minimum content of $H_2S$ that it is possible to obtain after treatment of the gas is a few ppm by volume. With the use of DEA, the performance levels obtained in terms of removal of $H_2S$ are identical, but it is also possible to remove COS, at 50% for an extensive removal, a step for hydrolysing COS into $H_2S$ being necessary upstream of the absorption column HCN is also removed, albeit at the cost of an irreversible degradation of the solvent.

The Rectisol™ process greatly improves the removal of $H_2S$, COS and $CO_2$ impurities since contents of from 0.1 ppm by weight to 1 ppm by weight of sulphur are obtained owing to the utilisation of a methanol extraction at very low temperatures (−40 to −60° C.). This process also allows the removal of other impurities such as nitrogen-containing compounds ($NH_3$, HCN) and heavy metals such as arsenic and mercury.

Processes can also be employed utilising physical solvents such as solvents based on mixtures of polyethylene glycol dialkyl ether, or those using mixed physical and chemical solvents such as mixtures of amines and sulpholane.

Processes using the principle of adsorption are based either on physical adsorption or on the sulphurisation reaction of a solid. In the former case, use is generally made of zeolites (3A, 4A, 5A, 13X, clinoptilolite, etc.) or activated aluminas or a combination of both. The limitations of physical adsorption relate to the coadsorption of the major constituents, and the sulphur adsorption capacity of these solids is limited, as is their lifetime. Moreover, these solids are very hydrophilic and it is therefore necessary to precede the adsorption step with a step for dehydrating the synthesis gas.

In the case of purification by sulphidation, the sulphur or the impurities to be removed interact chemically with a collecting mass to form a sulphide. The solids used as the collecting mass include, for example, copper, zinc, magnesium, iron, nickel or manganese-based oxides, alone or as a mixture. Alumina and silica can be used as a support or binder.

Patent application WO 2006/008317 discloses a process allowing removal of the sulphur contained in a synthesis gas at contents ranging up to 10 ppm by volume of $H_2S$ and COS, sulphur being removed until contents of the order of ppb by weight are achieved. The process described in this document combines a first step for hydrolysing COS into $H_2S$ in the presence of water and a hydrolysis catalyst, and a second step for removing $H_2S$ formed in the presence of an adsorbent composed of a metal or metal oxide, alone or combined and selected from Ag, Sn, Mo and Zn, deposited on an inorganic support. The catalyst utilised in the first hydrolysis step is, for its part, a refractory oxide selected from silicon, cerium, gallium, zirconium, titanium and aluminium oxides.

According to another patent application (WO 2007/082896), $H_2S$ and COS, and optionally HCN, are removed by contacting synthesis gas with an adsorbent containing a metal or an oxide or a combination of metals or oxides selected from Ag, Sn, Mo, Fe and Zn. The adsorbent is preferably ZnO. The desulphurisation step is followed by a washing step using an aqueous solution to remove the $NH_3$ formed.

The applicant has discovered a new process for removing impurities containing both sulphur such as $H_2S$ and COS, nitrogen-containing compounds such as HCN and $NH_3$, and halogen-containing compounds, said process allowing the purification of a synthesis gas initially containing these impurities at contents of generally from 0.1 to 50 ppm by weight for $H_2S$, from 0.1 to 50 ppm by weight for COS, from 0.1 to 50 ppm by weight for nitrogen-containing compounds and from 0.1 to 50 ppm by weight for halogen-containing compounds. The process according to the invention provides a purified gas now containing merely sulphur-containing impurities at contents of less than 10 ppb by weight, or even 5 ppb by weight, and, concomitantly, contents of nitrogen-containing impurities of less than 10 ppb by weight, or even 5 ppb by weight, and contents of halogen-containing impurities of less than 10 ppb by weight, or even 5 ppb by weight.

The process according to the invention can be used for purifying the synthesis gases utilised, for example, in cogeneration facilities, in chemical synthesis processes such as processes for synthesising methanol.

The process according to the invention is particularly capable of removing impurities contained in the synthesis gases used as the feedstock for Fischer-Tropsch units. Indeed, the extremely low contents of sulphur-containing, nitrogen-containing and halogen-containing impurities of synthesis gas have a beneficial effect on the conversion level and on the lifetime of the Fischer-Tropsch catalyst.

DETAILED DESCRIPTION

The invention relates to a process for removing sulphur-containing, nitrogen-containing and halogen-containing impurities contained in a synthesis gas, such as $H_2S$, COS, $CS_2$, HCN, $NH_3$, HF, HCl, HBr and HI, said process including:
a) a joint step for hydrolysing COS and HCN contained in the gas and for collecting the halogen-containing compounds using a $TiO_2$-based catalyst,
b) a solvent washing step,
c) a step for desulphurisation on a collecting or adsorbing mass.

The process according to the invention can be employed in order to purify the synthesis gases utilised in cogeneration facilities, or in chemical synthesis processes such as processes for synthesising methanol.

Advantageously, the process of the invention can be utilised upstream of a Fischer-Tropsch unit, in such a way as to remove impurities which have an adverse effect on correct operation of the unit.

The synthesis gas treated by the process of the invention can be obtained via the transformation of natural gas, coal or biomass by processes such as steam reforming, autothermal reforming or partial oxidation, or else via the decomposition of methanol, or from any other process known to the person skilled in the art. The synthesis gas comprises at least hydrogen and carbon monoxide.

In the particular case of Fischer-Tropsch synthesis, the synthesis gas used generally has an $H_2$/CO molar ratio of between 0.5 and 5.0, preferably between 1.2 and 3.1 and even more preferably between 1.5 and 2.6. The synthesis gas generally comprises in addition a small proportion of carbon dioxide ($CO_2$), preferably less than 15% by volume, or even less than 10% by volume, as well as water vapour.

The synthesis gas used as the feedstock for the process according to the invention can be obtained directly from a steam reforming, a partial oxidation or an autothermal reforming. All or part of the gas can also originate from a CO conversion unit (water gas shift).

The synthesis gas can also contain numerous impurities such as sulphur-containing ($H_2S$, COS, $CS_2$), nitrogen-containing ($NH_3$, HCN), halogen-containing (HF, HCl, HBr, HI) compounds, and also metals such as mercury, selenium, and/or other metals, optionally in the form of metal carbonyls.

The contents of impurities present in the gas at the end of the gasification are dependent on the nature of the feedstock used. More specifically, the contents of halogen-containing compounds can be roughly between 10 and 1,500 ppm by weight or else between 50 and 1,000 ppm by weight. The contents of sulphur-containing compounds can be of the order of from 20 to 15,000 ppm by weight, or even of from 100 to 10,000 ppm by weight.

The crude synthesis gas, which is obtained directly from the gasification and having optionally been subjected to a water gas shift step in order to adjust the $H_2$/CO ratio, is generally sent to one or more purification steps dedicated to removing the metals present as well as most of the sulphur-containing, nitrogen-containing and halogen-containing compounds. Said step or steps can be carried out by washing with the aid of a solvent. Solvent washing can be utilised with the aid of a solvent containing at least one amine, such as for example monoethanolamine (MEA), diethanolamine (DEA) or methyldiethanolamine (MDEA), or a solvent containing at least one alcohol such as methanol. Solvents based on mixtures of polyethylene glycol (PEG) dialkyl ether, such as PEG diethyl ether or dibutyl ether, can also be employed, or else mixed physical and chemical solvents such as those obtained, for example, from mixtures of an amine, such as MDEA or diisopropanolamine (DIPA), with sulpholane and water.

Following this optional treatment, the contents of impurities contained in the synthesis gas generally reach contents of from 0.1 to 50 ppm by weight for $H_2S$, from 0.1 to 50 ppm by weight for COS, from 0.1 to 50 ppm by weight for nitrogen-containing compounds and from 0.1 to 50 ppm by weight for halogen-containing compounds.

Alternatively, depending on the nature of the impurities which are initially present and on the contents thereof, the final purification of the synthesis gas can be implemented following the preceding purification step or as a substitute therefor with the aid of the process according to the invention. The process provides a purified gas now merely containing sulphur-containing impurities at contents of less than the 10 ppb by weight, most often less than 5 ppb by weight and, concomitantly, contents of nitrogen-containing impurities of less than 10 ppb by weight, or even 5 ppb by weight, and contents of halogen-containing impurities of less than 10 ppb by weight, or even 5 ppb by weight.

The process according to the invention can have a plurality of variants, depending on the nature of the impurities present and on the contents thereof, these variants differing in terms of the number and order of the steps introduced.

Said steps are:
a) a joint step for hydrolysing COS and HCN contained in the gas and for collecting the halogen-containing compounds via the use of a $TiO_2$-based catalyst,
b) a solvent washing step,
c) a step for desulphurisation on a collecting or adsorbing mass.

Step a) of the process according to the invention can be implemented on all of the feedstock (synthesis gas) or only on a fraction of said feedstock. A first variant addresses the most general case, for which all the types of impurities, halogen-containing, sulphur-containing and nitrogen-containing, are present in the gas to be treated. The first variant consists in successively linking the three steps a), b) and c) in this order. These steps are described hereinafter in greater detail.

According to a variant of the process according to the invention, said process can further include between steps b) and c) a step for hydrolysing the residual COS.

Step a:

In the first step of the process of the invention, hydrolysis/capturing (step a), the COS and HCN compounds are hydrolysed and respectively provide the reaction products $H_2S$ and $NH_3$. It is possible to carry out this step a) just once in the process according to the invention. However, according to a preferred variant, this step is performed at least twice and preferably a first time on all or part of the feedstock and before step b (first utilisation of step a), then a second time between steps b) and c) of the process according to the invention. This second carrying-out of step b can be utilised on the same catalyst or on a different catalyst. It allows in particular the removal of the residual COS which may not have been totally removed during the first utilisation of step a).

The hydrolysis is implemented in a reactor containing a $TiO_2$-based catalyst such as that described for example in patent FR 2 830 466.

Preferably, the catalyst utilised in step a) of the process of the invention comprises between 10% by weight and 100% by weight of $TiO_2$ and between 1% by weight and 30% by weight of at least one sulphate of an alkaline earth metal selected from calcium, barium, strontium and magnesium. Said sulphate is preferably calcium sulphate.

According to a preferred embodiment, said catalyst comprises between 30% by weight and 99% by weight of $TiO_2$, more preferably between 45% by weight and 98% by weight, very preferably between 60% by weight and 95% by weight, or even between 70% by weight and 90% by weight.

Preferably, said catalyst comprises between 3% by weight and 25% by weight and more preferably between 5% by weight and 15% by weight of at least one sulphate of an alkaline earth metal selected from calcium, barium, strontium and magnesium. Said sulphate is preferably calcium sulphate.

Preferably, said catalyst also comprises at least one compound selected from clays, silicates, aluminas, titanium sulphate, ceramic fibres, preferably clays or silicates, optionally aluminas, very preferably clays, at a total content of between 0.1% by weight and 30% by weight, preferably between 0.5% by weight and 25% by weight, more preferably between 1% by weight and 20% by weight, and very preferably between 5% by weight and 15% by weight. More preferably, said catalyst further comprises between 0.1 and 20% by weight, preferably between 0.5% by weight and 15% by weight and more preferably between 1% by weight and 10% by weight, of a doping compound or of a combination of doping compounds selected from compounds of iron, vanadium, cobalt, nickel, copper, molybdenum and tungsten. The doping compound or compounds are preferably in the form of oxides or sulphides. Preferably, said doping compound is iron, vanadium, nickel or molybdenum, very preferably iron or vanadium.

According to a particularly advantageous variant embodiment, said catalyst comprises:
  between 60% by weight and 95% by weight, or even between 70% by weight and 90% by weight, of titanium oxide,
  between 3% by weight and 25% by weight, or even between 5% by weight and 15% by weight of sulphate of an alkaline earth metal selected from calcium, barium, strontium and magnesium,
  between 0.1% by weight and 20% by weight, or even between 1 and 10% by weight of a doping compound or of a combination of doping compounds selected from compounds of iron, vanadium, cobalt, nickel, copper, molybdenum and tungsten, for example in oxide or sulphide form.

Dopant(s) can be added in this way during the shaping of the titanium oxide and the alkaline earth sulphate, or subsequently to this operation. In this latter scenario, a dry impregnation of one or more solutions of metal salts is preferred, the preparation conventionally ending with a thermal operation.

The catalyst can be in any known form: powder, balls, extrudates, monoliths, crushed material, etc. The preferred form of the catalyst is an extrudate, be it cylindrical or polylobular. In the case of a shaping by kneading followed by an extrusion, the cross section of the extrudate is advantageously between 0.5 and 8 mm, preferably between 0.8 and 5 mm.

Said catalyst can be utilised during step a) either in a fixed-bed reactor or in a radial reactor, or else in a fluidised bed, with or without use of a distributor plate.

Hydrolysis/capturing step a) is implemented at a pressure of between 0.5 and 10 MPa, preferably between 1.5 and 3.5 MPa, and even more preferably between 2.0 and 3.0 MPa, at a temperature of between 100 and 350° C., preferably between 100 and 250° C., and even more preferably at a temperature equal to 200° C.

At the end of step a), the only major impurities still contained in the synthesis gas are $H_2S$ and $NH_3$ formed during the hydrolysis of COS and HCN. The contents of $H_2S$ and $NH_3$ contained in the synthesis gas at the end of step a) are dependent on the initial amounts present in the gas before step a) and are generally between 0.1 ppb by weight and 100 ppm by weight for $H_2S$ and between 0.1 ppb by weight and 50 ppm by weight for $NH_3$. The content of halogen-containing impurities is less than 10 ppb by weight, or even less than 5 ppb by weight.

Step b:

This washing step is carried out by means of at least one solvent. Solvent washing step b) seeks to remove the $NH_3$ formed during step a), as well as any impurities other than nitrogen-containing, halogen-containing and sulphur-containing impurities which are initially contained in the synthesis gas and on which step a) would not have had an effect. The washing step is for example carried out in a washing tower utilising one or more solvents. The solvent(s) are a solution comprising a compound selected from water, sodium hydroxide, amines, such as for example monoethanolamine (MEA), diethanolamine (DEA), aminoethylethanolamine (AEEA), methyldiethanolamine (MDEA), triethanolamine (TEA), diisopropanolamine (DIPA), and alcohols, such as for example methanol, or mixtures thereof. Solvents based on mixtures of polyethylene glycol (PEG) dialkyl ether, such as PEG diethyl ether or dibutyl ether, can also be employed, or else mixed physical and chemical solvents such as those obtained, for example, from mixtures of an amine, such as MDEA or DIPA, with sulpholane and water.

Thus, the solvent used for washing the gas during step b) can optionally be a solution containing a compound alone or as a mixture selected from water, sodium hydroxide, amines, alcohols, polyethylene glycol dialkyl ethers, or mixtures of amines and sulpholane.

The washing tower can be equipped with any type of internal means known to the person skilled in the art (plates, random packing, structured packing) promoting gas/liquid contact, the solvent being sprayed at the top of said tower and the gas flowing in countercurrent therein. Solvent washing step b) is implemented at an identical pressure to that of step a), of between 0.5 and 10 MPa, preferably between 1.5 and 3.5 MPa and even more preferably between 2.0 and 3.0 MPa, at a temperature which is dependent on the solvent used.

If the solvent utilised is a solution of water or sodium hydroxide, the temperature of the solvent is between 30 and 250° C., preferably between 30 and 100° C.

In the case of the utilisation of an amine, the temperature is between 30 and 250° C., preferably between 30 and 100° C.

In the case of the utilisation of polyethylene glycol dialkyl ether, the temperature is generally between −30 and 175° C., preferably between −10 and 100° C.

In the case of the utilisation of mixtures of amines and sulpholane, the temperature is generally between −30 and 150° C., preferably between −10 and 100° C.

In the case of a methanol washing process, the temperature of the solvent is generally between −80 and 200° C., preferably between −60 and 100° C., typically from −60 to 40° C.

It is also possible, according to certain preferred variants, to successively carry out a plurality of washing steps b using the same solvent or a mixture of a plurality of solvents or else, and preferably, using different successive solvents. Thus, for example, it is possible to carry out first of all a washing using water in order to remove preferably the ammonia ($NH_3$) formed during the hydrolysis of HCN, then to carry out a washing of the acid gases by means of a chemical solvent such as an amine or an amine/sulpholane mixture, or of a physical solvent such as an alcohol, preferably methanol.

Preferably, if step b comprises at least the 2 steps described hereinbefore, the washing in water and the removal of the acid gases are performed in series and these 2 steps are located between hydrolysis step a) and desulphurisation step c).

At the end of step b), the synthesis gas generally contains an $NH_3$ content of less than 10 ppb by weight, or even less than 5 ppb by weight of $NH_3$. The solvent washing also allows the withdrawal of other impurities which may be present during the treatment such as metals or metal carbonyls.

Step c:

After the solvent washing step, the synthesis gas is then introduced into a desulphurisation unit (step c)) utilising a collecting mass or an adsorbent known to the person skilled in the art, said adsorbent being optionally regenerable. This solid can conventionally contain a metal, oxide, zeolite, or else carbonate-type compound and at least one element selected from the group formed by Ca, Mg, Mn, Fe, Ni, Cu, Zn, Ag, Sn, La, Ce. Preferably, the desulphurisation step is utilised advantageously with the aid of a collecting mass containing as its major constituent ZnO at a content of between 85% by weight and 100% by weight, and very preferably between 95% by weight and 100% by weight.

Binders can be used such as silica, alumina or an alumina precursor, clays such as bentonite, kaolinite, montmorillonite, alone or as a mixture, in order to impart sufficient mechanical strength to the solid which is shaped. The collecting mass can be in the form of preferably cylindrical or multilobular extrudates, spheres or pellets.

In certain cases, for example if the solid used in step c) contains zinc oxide (ZnO), the solid which is active for removing $H_2S$ can also be active with regard to the hydrolysis of the COS. In this case, step c is both a desulphurisation step and at the same time a step for removing the residual COS. This variant is particularly useful should the first hydrolysis step a) not have allowed all of the COS to be removed.

Said collecting or adsorbing mass can be utilised either in a fixed-bed reactor or in a radial reactor, or else in a fluidised bed, with or without use of a distributor plate.

Desulphurisation step c) is implemented at an identical pressure to that of steps a) and b), of between 0.5 and 10 MPa, preferably between 1.5 and 3.5 MPa, and even more preferably between 2.0 and 3.0 MPa, at a temperature of between 100 and 400° C., preferably between 150 and 350° C., and even more preferably at a temperature equal to 200° C.

At the end of step c), the synthesis gas contains almost no sulphur-containing, nitrogen-containing and halogen-containing impurities, the respective contents of these impurities being less than 10 ppb by weight, or even 5 ppb by weight for all of the sulphur-containing compounds, less than 10 ppb by weight, or even 5 ppb by weight for all of the nitrogen-containing compounds, and less than 10 ppb by weight, or even 5 ppb by weight for all of the halogen-containing compounds.

At the end of step c), the purified synthesis gas is admitted, for example, into a Fischer-Tropsch synthesis unit or into a methanol synthesis unit, or any other process for converting synthesis gas.

Other Variants of the Process According to the Invention:

Two other variants of the process according to the invention are applicable in the particular case in which the feedstock to be treated contains no nitrogen-containing impurities. In these two cases, the impurities to be removed are the sulphur-containing and halogen-containing compounds, and it is not necessary to utilise solvent washing step b).

According to a second variant, the process according to the invention includes the linking of step a) for hydrolysing COS and removing halogens and step c) for desulphurisation on a collecting or adsorbing mass, optional washing step b) being omitted. This variant is particularly preferred if the feedstock to be treated does not contain any nitrogen-containing impurities.

According to a third variant, steps a) and c) are performed jointly in one and the same fixed-bed reactor, arranged in which are the first $TiO_2$-based solid which is active with regard to COS hydrolysis and collecting the halogen-containing compounds, as well as the desulphurising collecting mass. The reactor is filled in such a way that the desulphurising collecting mass is placed downstream of the $TiO_2$-based catalyst. In this way, the catalyst allows the removal of the halogen-containing impurities and the COS that are present in the entering gas stream. The $H_2S$ formed during the COS hydrolysis is collected directly in situ by the collecting mass which is also placed in the reactor upstream of the $TiO_2$-based catalyst. It is also conceivable to have in the reactor successive $TiO_2$-based catalyst and $H_2S$-collecting mass layers.

According to other variants, it is also possible to repeat the linking of the steps in order to improve the efficiency of the process, in particular the linking of steps a) and c) in order to increase the COS conversion rate.

According to other variants, the process according to the invention further includes, between steps b) and c), a step for hydrolysing the residual COS.

The process according to the invention can also include a plurality of COS hydrolysis sections. Thus, certain preferred variants of the process according to the invention include the following steps:

a joint step a) for hydrolysing COS and HCN and for collecting the halogen-containing compounds, implemented on all or part of the feedstock via the use of a $TiO_2$-based catalyst,
  a washing step b) using at least one solvent,
  a step for hydrolysing the residual COS implemented either in accordance with the mode of operation of step a) or in accordance with the mode of operation of step c) if the solid used in step c) also allows the hydrolysing of the COS to be carried out,
  a step c) for desulphurisation on a collecting mass or an adsorbent.

According to a variant A of the process according to the invention:

a fraction of the synthesis gas obtained from the gasification (section for producing synthesis gas) is treated in a unit for converting CO with water (water gas shift),
  the complementary fraction is sent to COS and HCN hydrolysis step a),
  the effluent obtained from the CO conversion unit is mixed with the complementary synthesis gas fraction treated during step a),
  the mixture obtained is treated in accordance with step b) by washing using at least one solvent,
  the effluent obtained from the washing is re-treated in a COS hydrolysis step in order to remove the residual COS, the effluent obtained from the hydrolysis of the residual COS is treated in accordance with desulphurisation step c).

According to a variant B of the process according to the invention:
- a fraction of the synthesis gas obtained from the gasification (section for producing synthesis gas) is treated in a unit for converting CO with water and the complementary fraction is not treated,
- the effluent obtained from the CO conversion unit is mixed with the complementary fraction of the untreated synthesis gas,
- the mixture thus obtained is sent to COS and HCN hydrolysis step a),
- the mixture obtained is treated in accordance with step b) by washing using at least one solvent,
- the effluent obtained from the washing is re-treated in a COS hydrolysis step in order to remove the residual COS,
- the effluent obtained from the hydrolysis of the residual COS is treated in accordance with desulphurisation step c).

According to other preferred variants, the steps for hydrolysing the residual COS and for desulphurisation according to step c) of variants A and B according to the invention are carried out simultaneously in the presence of an active solid: the solid which is active for removing $H_2S$ and hydrolysing COS.

The synthesis gas purified in accordance with the process of the invention can also be utilised in a cogeneration facility or in a chemical synthesis unit, such as a methanol synthesis unit.

In cogeneration facilities, synthesis gases are generally utilised at a pressure of between 1 and 10 MPa and at a temperature of between 100 and 280° C.

The synthesis of methanol is generally utilised, in the most recent processes, at a pressure of between 1 and 15 MPa, preferably between 5 and 10 MPa and at a temperature of between 150 and 300° C., preferably between 220 and 280° C.

Advantageously, the synthesis gas purified in accordance with the process of the invention can be admitted into a Fischer-Tropsch synthesis unit, operating either in a fluidised bed or in a fixed bed (reactor containing a fixed-bed catalyst or else a plurality of catalyst beds in the same reactor), or preferably in a three-phase reactor (utilised in a slurry) comprising the catalyst suspended in a basically inert liquid phase and the reactive gas phase (synthesis gas). Fischer-Tropsch synthesis is generally utilised at a pressure of between 0.1 and 15 MPa, preferably between 1.5 and 5 MPa and at a temperature of between 150 and 400° C., preferably between 170 and 350° C. The catalyst used for the Fischer-Tropsch synthesis is generally a catalyst containing supported or non-supported cobalt or iron, the support preferably being selected from the oxides of the group formed by alumina, silica, zirconia, titanium oxide, magnesium oxide or mixtures thereof. The process of the invention is more specifically appropriate if the Fischer-Tropsch synthesis catalyst comprises cobalt supported on alumina.

EXAMPLES

The scope of the invention is illustrated by Examples 1 to 6. Examples 1 and 2 relate more specifically to step a), describing as they do the effect of the hydrolysis catalyst on the removal of the halogen-containing impurities present in the gas.

Examples 3 describes the linking of the three steps a), b) and c) if the gas contains sulphur-containing, nitrogen-containing and halogen-containing impurities. Example 4, which is not in accordance with the invention, highlights the need for the presence of washing step b) if nitrogen-containing impurities are present. Examples 5 and 6 illustrate the cases in which the gas to be treated contains no nitrogen-containing impurities.

Example 1

According to the Invention

A synthesis gas containing approximately 61% by volume of CO, 19% by volume of $H_2$, 10% by volume of $N_2$ and 10% by volume of CO2 as major constituents, as well as impurities at contents of 10,000 ppm by weight of $H_2S$, 1,200 ppm by weight of COS, 5 ppm by weight of HCl, 0.8 ppm by weight of HF, 4 ppm by weight of HBr, 1.5 ppm by weight of HI, 100 ppm by weight of HCN and 3 ppm by weight of $NH_3$ as described in Table 1, is used as the feedstock for the process according to the invention.

The catalyst used during hydrolysis/capturing step a) consists of 90% by weight of $TiO_2$ and of 10% by weight of $CaSO_4$. The solid is utilised in the form of extrudates having a diameter of 2 mm. The temperature of the hydrolysis/capturing step is fixed at 180° C.; the pressure of the gas is maintained at 2.3 MPa. The HVR (hourly volume rate) is fixed at 2,500 $h^{-1}$.

The composition of the gas at the output of the hydrolysis/capturing zone is set out in Table 1.

TABLE 1

Amounts of impurities present in the synthesis gas stream at the start and at the end of step a)

| Impurities present in the gas | Content (ppm by weight) before purification | Content (ppb by weight) after purification |
|---|---|---|
| $H_2S$ | 10,000 | Not analysed |
| $NH_3$ | 3 | Not analysed |
| COS | 1,200 | <5 |
| HCN | 100 | <5 |
| HCl | 5 | <5 |
| HF | 0.8 | <5 |
| HBr | 4 | <5 |
| HI | 1.5 | <5 |

The COS and also the HCN and the halogen-containing compounds which are initially present are fully removed from the gas after treatment on the solid.

Moreover, the solid used in step a) of the process was analysed using a semi-quantitative assay technique based on an X-ray fluorescence analysis.

The composition of the solid before and after utilisation in the process is set out in Table 2. In fact, it will be noted that the halogen-containing impurities which are initially present in the gas to be treated have been trapped on the solid.

TABLE 2

Contents of halogen-containing compounds measured on the solid before and after utilisation of step a)

| Halogen-containing impurities | Initial content (% by weight) on the solid | Content (% by weight) after utilisation of the solid in the hydrolysing/capturing process |
|---|---|---|
| Fluorine | Not detected | 0.05 |
| Chlorine | Not detected | 0.3 |
| Iodine | Not detected | 0.1 |
| Bromine | Not detected | 0.24 |

Example 2

According to the Invention

A synthesis gas containing approximately 36% by volume of CO, 24% by volume of $H_2$, 20% by volume of $H_2O$ and 18.5% by volume of CO2 as major constituents, as well as impurities at contents of 10,000 ppm by weight of $H_2S$, 800 ppm by weight of COS, 25 ppm by weight of HCl, 1.6 ppm by weight of HBr, 640 ppm by weight of HCN and 2,000 ppm by weight of $NH_3$, is used as the feedstock for the process according to the invention.

The catalyst used during hydrolysis/capturing step a) consists of 85.5% by weight of $TiO_2$, 0.5% by weight of $Al_2O_3$ and 10% by weight of $CaSO_4$. The solid is utilised in the form of extrudates having a diameter of 2 mm. The temperature of the hydrolysis/capturing step is fixed at 190° C.; the pressure of the gas is maintained at 2.5 MPa. The HVR (hourly volume rate) is fixed at 4,000 $h^{-1}$.

The composition of the gas at the output of the hydrolysis/capturing zone is set out in Table 3:

TABLE 3

Amounts of impurities present in the synthesis gas stream at the start and at the end of step a)

| Impurities present in the gas | Content (ppm by weight) before purification | Content (ppb by weight) after purification |
|---|---|---|
| $H_2S$ | 10,000 | Not analysed |
| $NH_3$ | 2,000 | Not analysed |
| COS | 800 | <5 |
| HCN | 640 | <5 |
| HCl | 25 | <5 |
| HBr | 1.6 | <5 |

The COS and also the HCN and the halogen-containing compounds which are initially present are fully removed from the gas after treatment on the solid.

The solid used in the process during the experiment was analysed using a semi-quantitative assay technique based on an X-ray fluorescence analysis. The composition of the solid before and after utilisation in the process is set out in Table 4. In fact, it will be noted that the chlorine and the bromine which are initially present in the gas to be treated have been trapped on the solid.

TABLE 4

Contents of halogen-containing compounds measured on the solid before and after utilisation of step a)

| Halogen-containing impurities | Initial content (% by weight) on the solid | Content (% by weight) after utilisation of the solid in the hydrolysing/capturing process |
|---|---|---|
| Chlorine | Not detected | 0.18 |
| Bromine | Not detected | 0.012 |

Example 3

According to the Invention

A synthesis gas containing approximately 28% by volume of CO, 60% by volume of $H_2$, 2% by volume of $H_2O$ and 10% by volume of argon as major constituents, as well as impurities at contents of 20 ppm by weight of $H_2S$, 2 ppm by weight of COS, 5 ppm by weight of HCl, 10 ppm by weight of HCN and 15 ppm by weight of $NH_3$ as described in Table 5, is used as the feedstock for the process according to the invention.

The catalyst used during hydrolysis/capturing step a) consists of 85.5% by weight of $TiO_2$, 0.5% by weight of $Al_2O_3$ and 10% by weight of $CaSO_4$. The capturing mass used during desulphurisation step c) consists of 95% by weight of ZnO and of 5% by weight of kaolinite-type clay. Each solid is in the form of extrudates having a diameter of 2 mm.

The temperature of steps a) and c) is fixed at 200° C.; the pressure of the gas is maintained at 2.5 MPa throughout the steps of the process. The HVR (hourly volume rate) is fixed at 3,000 $h^{-1}$.

At the output of the hydrolysis/capturing zone (step a)), the impurities present in the gas consist solely of $H_2S$ and $NH_3$ (compounds which are initially present, to which the hydrolysis products, COS and HCN, are added). Moreover, the HCl has been trapped on the $TiO_2$ catalyst.

Most of the $NH_3$ is removed at the end of the washing step (step b)). The temperature of the water is fixed at 90° C.

Step c), for desulphurisation on the ZnO-based collecting mass, allows withdrawal of the remaining $H_2S$ at residual contents of the order of ppb by weight.

The compositions of the gas between each purification step of the process are presented in Table 5.

TABLE 5

Amounts of impurities present in the synthesis gas stream at the start and at the end of each purification step utilised in the process

| Impurities present in the gas | Content (ppm by weight) at the start of step a) | Content (ppb by weight) at the end of step a) | Content (ppb by weight) at the end of washing step b) | Content (ppb by weight) at the end of desulphurisation step c) |
|---|---|---|---|---|
| $H_2S$ | 20 | 22,000 | 20,000 | <5 |
| COS | 2 | <5 | <5 | <5 |
| HCl | 5 | <5 | <5 | <5 |
| HCN | 10 | <5 | <5 | <5 |
| $NH_3$ | 15 | 25,000 | <5 | <5 |

The results presented in Table 5 highlight the very low contents of sulphur-containing, nitrogen-containing and halogen-containing impurities contained in the synthesis gas at the end of the process of the invention.

Example 4

Not in Accordance with the Invention

The experiment specified in Example 3 was reproduced while maintaining all the parameters in identical form but without washing step b). In this case, the $NH_3$ formed at the end of hydrolysis/collecting step a) is not removed from the synthesis gas. The compositions of the gas between each purification step are presented in Table 6.

TABLE 6

Amounts of impurities present in the synthesis gas stream at the start and at the end of each purification step utilised in the process (without the washing step)

| Impurities present in the gas | Content (ppm by weight) at the start of step a) | Content (ppb by weight) at the end of step a) | Content (ppb by weight) at the end of desulphurisation step c) |
|---|---|---|---|
| $H_2S$ | 20 | 22,000 | <5 |
| COS | 2 | <5 | <5 |
| HCl | 5 | <5 | <5 |

TABLE 6-continued

Amounts of impurities present in the synthesis gas stream at the start and at the end of each purification step utilised in the process (without the washing step)

| Impurities present in the gas | Content (ppm by weight) at the start of step a) | Content (ppb by weight) at the end of step a) | Content (ppb by weight) at the end of desulphurisation step c) |
|---|---|---|---|
| HCN | 10 | <5 | <5 |
| $NH_3$ | 15 | 25,000 | 25,000 |

Example 5

According to the Invention

A synthesis gas containing approximately 28% by volume of CO, 60% by volume of $H_2$, 2% by volume of $H_2O$ and 10% by volume of argon as major constituents, as well as impurities at contents of 20 ppm by weight of $H_2S$, 2 ppm by weight of COS, 5 ppm by weight of HCl as described in Table 7, is used as the feedstock for the process according to the invention. In this case, the gas does not contain any nitrogen-containing impurities such as $NH_3$ and HCN.

The process utilised carries out the linking of hydrolysis/capturing step a) and desulphurisation step c) without the intermediate washing step.

The catalyst used during hydrolysis/capturing step a) consists of 85.5% by weight of $TiO_2$, 0.5% by weight of $Al_2O_3$ and 10% by weight of $CaSO_4$. The capturing mass used during desulphurisation step c) consists of 95% by weight of ZnO and of 5% by weight of kaolinite-type clay. Each solid is in the form of extrudates having a diameter of 2 mm.

The temperature of steps a) and c) is fixed at 200° C.; the pressure of the gas is maintained at 2.5 MPa throughout the steps of the process. The HVR (hourly volume rate) is fixed at 3,000 $h^{-1}$.

At the output of the hydrolysis/capturing zone (step a)), the impurities present in the gas consist solely of $H_2S$. Some of these are the $H_2S$ which is initially present, to which is added the $H_2S$ produced during the COS hydrolysis. Moreover, the HCl has been trapped on the $TiO_2$-based catalyst.

Step c), for desulphurisation on the ZnO-based collecting mass, allows withdrawal of the remaining $H_2S$ at residual contents of the order of ppb by weight.

The compositions of the gas between each purification step of the process are presented in Table 7.

TABLE 7

Amounts of impurities present in the synthesis gas stream at the start and at the end of each purification step utilised in the process

| Impurities present in the gas | Content (ppm by weight) at the start of step a) | Content (ppb by weight) at the end of step a) | Content (ppb by weight) at the end of desulphurisation step c) |
|---|---|---|---|
| $H_2S$ | 20 | 22,000 | <5 |
| COS | 2 | <5 | <5 |
| HCl | 5 | <5 | <5 |

The results presented in Table 7 highlight the very low contents of sulphur-containing and halogen-containing impurities contained in the synthesis gas at the end of the process according to the invention.

Example 6

According to the Invention

A synthesis gas containing approximately 28% by volume of CO, 60% by volume of $H_2$, 2% by volume of $H_2O$ and 10% by volume of argon as major constituents, as well as impurities at contents of 20 ppm by weight of $H_2S$, 2 ppm by weight of COS, 5 ppm by weight of HCl as described in Table 8, is used as the feedstock for the process according to the invention. In this case, the gas does not contain any nitrogen-containing impurities such as $NH_3$ and HCN.

The preceding example is reproduced here by combining steps a) and c) into one and the same step, washing step b) being omitted.

The $TiO_2$-based catalyst, allowing COS hydrolysis and the collection of the halogen-containing compounds, and the ZnO-based desulphurising collecting mass are placed in a fixed-bed reactor. The reactor is filled in such a way that the ZnO-based solid is placed in the reactor downstream of the $TiO_2$-based catalyst. The reactor is filled while adhering to a 50-50 equivalent distribution of the two solids.

The catalyst used for the hydrolysis/capturing (situated in the reactor, upstream part) consists of 85.5% by weight of $TiO_2$, 0.5% by weight of $Al_2O_3$ and 10% by weight of $CaSO_4$. The collecting mass used for the desulphurisation (in the downstream part of the reactor) consists of 95% by weight of ZnO and of 5% by weight of kaolinite-type clay. Each solid is in the form of extrudates having a diameter of 2 mm.

The temperature of the gas to be treated in the process is fixed at 200° C.; the pressure of the gas is maintained at 2.5 MPa. The HVR (hourly volume rate) is fixed at 1,500 $h^{-1}$.

At the output of the reactor, the gas now contains HCl, COS as well as $H_2S$ only at residual contents of the order of ppb by weight.

The HCl has been trapped on the $TiO_2$-based catalyst, allowing the COS which is initially present in the feedstock also to be hydrolysed. The collecting mass arranged in the same reactor following the $TiO_2$-based catalyst allows the $H_2S$ to be collected immediately.

The compositions of the gas before and after the purification step of the process are presented in Table 8.

TABLE 8

Amounts of impurities present in the synthesis gas stream before and after the purification step utilised in the process

| Impurities present in the gas | Content (ppm by weight) at the start of step a) | Content (ppb by weight) at the end of desulphurisation step c) |
|---|---|---|
| $H_2S$ | 20 | <5 |
| COS | 2 | <5 |
| HCl | 5 | <5 |

The results presented in Table 8 highlight the very low contents of sulphur-containing and halogen-containing impurities contained in the synthesis gas at the end of the process of the invention.

The invention claimed is:

1. A process for removing sulphur-containing, nitrogen-containing and halogen-containing impurities including $H_2S$, COS, $CS_2$, HCN, $NH_3$, HF, HCl, HBr or HI, contained in a synthesis gas, said process comprising:
   a) joint hydrolyzing of COS and HCN and collecting halogen-containing compounds using a $TiO_2$-based catalyst comprising between 10% by weight and 100% by weight of $TiO_2$ and between 1% by weight and 30% by weight of at least one sulphate of an alkaline earth metal that is calcium, barium, strontium or magnesium,
  b) washing using at least one solvent,
  c) desulphurization on a collecting or adsorbing mass.

2. The process according to claim 1, wherein a), b) and c) are carried out successively in the order listed.

3. The process according to claim 2, further including between b) and c) hydrolyzing residual COS.

4. The process according to claim 3, comprising:
  a) joint hydrolyzing COS and HCN and collecting halogen-containing compounds, implemented on all or part of the feedstock via the use of said $TiO_2$-based catalyst,
  washing b) using at least one solvent,
  hydrolyzing residual COS implemented either in accordance with the mode of operation of a) or in accordance with the mode of operation of c) when the solid used in c also allows the hydrolyzing of the COS to be carried out,
  a c) for desulphurization on a collecting mass or an adsorbent.

5. The process according to claim 4, wherein the hydrolyzing of the residual COS is implemented in accordance with the mode of operation of a).

6. The process according to claim 4, wherein the hydrolyzing of the residual COS is implemented simultaneously with c) using a solid allowing both the hydrolyzing of the COS and the desulphurization to be carried out.

7. The process according to claim 1, wherein the catalyst utilized in a) contains:
  between 60% and 95% by weight of titanium oxide,
  between 3% and 25% by weight of alkaline earth sulphate,
  between 0.1% and 20% by weight of a doping compound or of a combination of doping compounds containing iron, vanadium, cobalt, nickel, copper, molybdenum, tungsten in oxide and/or sulphide form.

8. The process according to claim 1, wherein hydrolysis/collecting in a is implemented at a pressure of between 0.5 and 10 MPa and at a temperature of between 100 and 350° C.

9. The process according to claim 1, wherein the solvent used for washing the gas during b) is a solution containing alone or as a mixture water, sodium hydroxide, amines, alcohols, polyethylene glycol dialkyl ethers, or mixtures of amines and sulpholane.

10. The process according to claim 9, wherein the solvent used for washing in b) is a solution containing water and sodium hydroxide, and said b) is implemented at a pressure of between 0.5 and 10 MPa and at a temperature of between 30 and 250° C.

11. The process according to claim 9, wherein the solvent used for washing in b) is an amine, and said b) is implemented at a pressure of between 0.5 and 10 MPa and at a temperature of between 30 and 250° C.

12. The process according to claim 9, wherein the solvent used in b) is a solution containing an alcohol and said b) is implemented at a pressure of between 0.5 and 10 MPa and at a temperature of between −80 and 200° C.

13. The process according to claim 1, wherein said desulphurization c) is performed with a collecting or adsorbing mass containing a metal, oxide, zeolite or carbonate-type compound and at least one of Ca, Mg, Mn, Fe, Ni, Cu, Zn, Ag, Sn, La or Ce, alone or as a mixture.

14. The process according to claim 13, wherein said desulphurization is performed with a collecting mass containing ZnO at a content of between 85% by weight and 100% by weight.

15. The process according to claim 13, wherein said desulphurization c) is implemented at a pressure of between 0.5 and 10 MPa and at a temperature of between 100 and 400° C.

16. The process according to claim 1, wherein at the end of c), purified synthesis gas is admitted into a Fischer-Tropsch synthesis unit.

17. The process according to claim 1, wherein at the end of c), purified synthesis gas is admitted into a methanol synthesis unit.

* * * * *

UNITED STATES PATENT AND TRADEMARK OFFICE
CERTIFICATE OF CORRECTION

PATENT NO. : 8,617,501 B2  Page 1 of 1
APPLICATION NO. : 13/144138
DATED : December 31, 2013
INVENTOR(S) : Chiche et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Twenty-second Day of September, 2015

Michelle K. Lee
*Director of the United States Patent and Trademark Office*